US011374783B2

(12) United States Patent
Peterson et al.

(10) Patent No.: US 11,374,783 B2
(45) Date of Patent: Jun. 28, 2022

(54) SYSTEMS AND METHODS FOR DIFFERENTIAL PRESSURE DETERMINATION AND CONTROL

(71) Applicant: XCSPEC, INC., Redmond, WA (US)

(72) Inventors: Janet Peterson, Larkspur, CA (US); Peter Peterson, Larkspur, CA (US)

(73) Assignee: XCSPEC, Inc., Corte Madera, CA (US)

( * ) Notice: Subject to any disclaimer, the term of this patent is extended or adjusted under 35 U.S.C. 154(b) by 0 days.

(21) Appl. No.: 16/792,481

(22) Filed: Feb. 17, 2020

(65) Prior Publication Data

US 2020/0267015 A1     Aug. 20, 2020

Related U.S. Application Data

(60) Provisional application No. 62/807,385, filed on Feb. 19, 2019.

(51) Int. Cl.
*H04W 4/38* (2018.01)
*H04L 12/28* (2006.01)

(52) U.S. Cl.
CPC ...... *H04L 12/2823* (2013.01); *H04L 12/2816* (2013.01); *H04W 4/38* (2018.02); *H04L 2012/2847* (2013.01)

(58) Field of Classification Search
CPC .............. H04L 12/2823; H04L 12/2816; H04L 2012/2847; H04W 4/38; G08B 21/182; G08B 21/12; B25J 9/161; B25J 9/1671; G01N 33/00; G05B 15/02; G05B 2219/2642; G05B 2219/39168; G06N 3/008

See application file for complete search history.

(56) References Cited

U.S. PATENT DOCUMENTS

| | | | | | |
|---|---|---|---|---|---|
| 3,245,612 A | * | 4/1966 | Nilsson | ............... | F01C 1/084 418/201.3 |
| 5,708,195 A | * | 1/1998 | Kurisu | ............... | G01M 3/2815 73/40 |
| 2001/0001616 A1 | * | 5/2001 | Rakib | ............... | H04N 7/10 375/259 |
| 2003/0061002 A1 | * | 3/2003 | Steinbrecher | ............ | G01S 11/16 702/159 |
| 2003/0197604 A1 | * | 10/2003 | Ogawa | ............... | B60C 23/0408 340/445 |
| 2009/0216499 A1 | * | 8/2009 | Tobola | ............... | A61B 5/14551 702/190 |

(Continued)

FOREIGN PATENT DOCUMENTS

CN   206311166 U   *   7/2017
CN   108007527 A   *   5/2018

*Primary Examiner* — Hai Phan
*Assistant Examiner* — Anthony D Afrifa-Kyei

(57) ABSTRACT

Systems and Methods for Differential Pressure Determination and Control are disclosed. In one aspect, embodiments of the present disclosure include a system, which able to obtain pressure measurements. The system can include, a sensor and a processor coupled to the sensor. A further embodiment includes memory coupled to the processor where the memory has stored thereon instructions, which when executed by the processor, cause the processor to: determine, a local set of pressure measurements from the sensor and/or compare the local set of pressure measurements with an external set of pressure measurements.

33 Claims, 7 Drawing Sheets

(56) References Cited

U.S. PATENT DOCUMENTS

| | | | |
|---|---|---|---|
| 2014/0032161 A1* | 1/2014 | Das | G01S 5/0009 |
| | | | 702/138 |
| 2014/0109681 A1* | 4/2014 | Sgourakes | G01L 13/025 |
| | | | 73/718 |
| 2014/0338459 A1* | 11/2014 | Besling | G01L 13/025 |
| | | | 73/718 |
| 2015/0328402 A1* | 11/2015 | Nogueira | G05B 15/02 |
| | | | 604/504 |
| 2016/0178677 A1* | 6/2016 | Mansouri | G01K 1/026 |
| | | | 700/297 |
| 2017/0296727 A1* | 10/2017 | Burbank | A61M 1/165 |
| 2019/0088098 A1* | 3/2019 | Gangumalla | G01L 19/12 |
| 2019/0138870 A1* | 5/2019 | Kuzbari | G06K 19/07716 |
| 2019/0372449 A1* | 12/2019 | Mills | G21B 3/00 |
| 2020/0196110 A1* | 6/2020 | Jakobsson | H04W 4/029 |
| 2020/0232485 A1* | 7/2020 | Coakley | B60G 17/0528 |
| 2020/0322703 A1* | 10/2020 | Bures | G06F 16/27 |

\* cited by examiner

SYSTEMS AND METHODS FOR DIFFERENTIAL PRESSURE DETERMINATION AND CONTROL

CLAIM OF PRIORITY

This application claims the benefit of:
* U.S. Provisional Application No. 62/807,385, filed Feb. 19, 2019 and entitled "TUBELESS COMMUNICATING DIFFERENTIAL PRESSURE CONTROL SYSTEM," (8001.US00), the contents of which are incorporated by reference in their entirety.

TECHNICAL FIELD

The disclosed technology relates generally to systems and methods for differential pressure determination.

BACKGROUND

Many industrial, aviation, pipeline, HVAC, medical, process control, etc. systems use differential pressures to provide the feedback for equipment and space control. To date, differential pressure has been determined by placing tubes connected to one sensor into the areas of interest with the sensor continuously determining the pressure difference between the ends of the tubes.

However, tubes have a number of limitations. Placement design of the tubes is cumbersome as the tubes must be the same length, tubes can not be kinked or constricted. Additionally, coiling the tube is difficult. Tubes are difficult to install as they can span between floors in building or through plenums and ducting. Over time the tubes may become constricted with insects, grim or grease. These are all contributing causes for measurement readings to fail.

As such, traditional methods of measuring differential pressure are problematic. Moreover, in most systems the differential sensor output range in terms of measurement must be pre-specified or predetermined. Since tube lengths are limited, measuring pressure differential between distant points is also not possible by existing differential pressure sensor.

DETAILED DESCRIPTION

Figure 1:
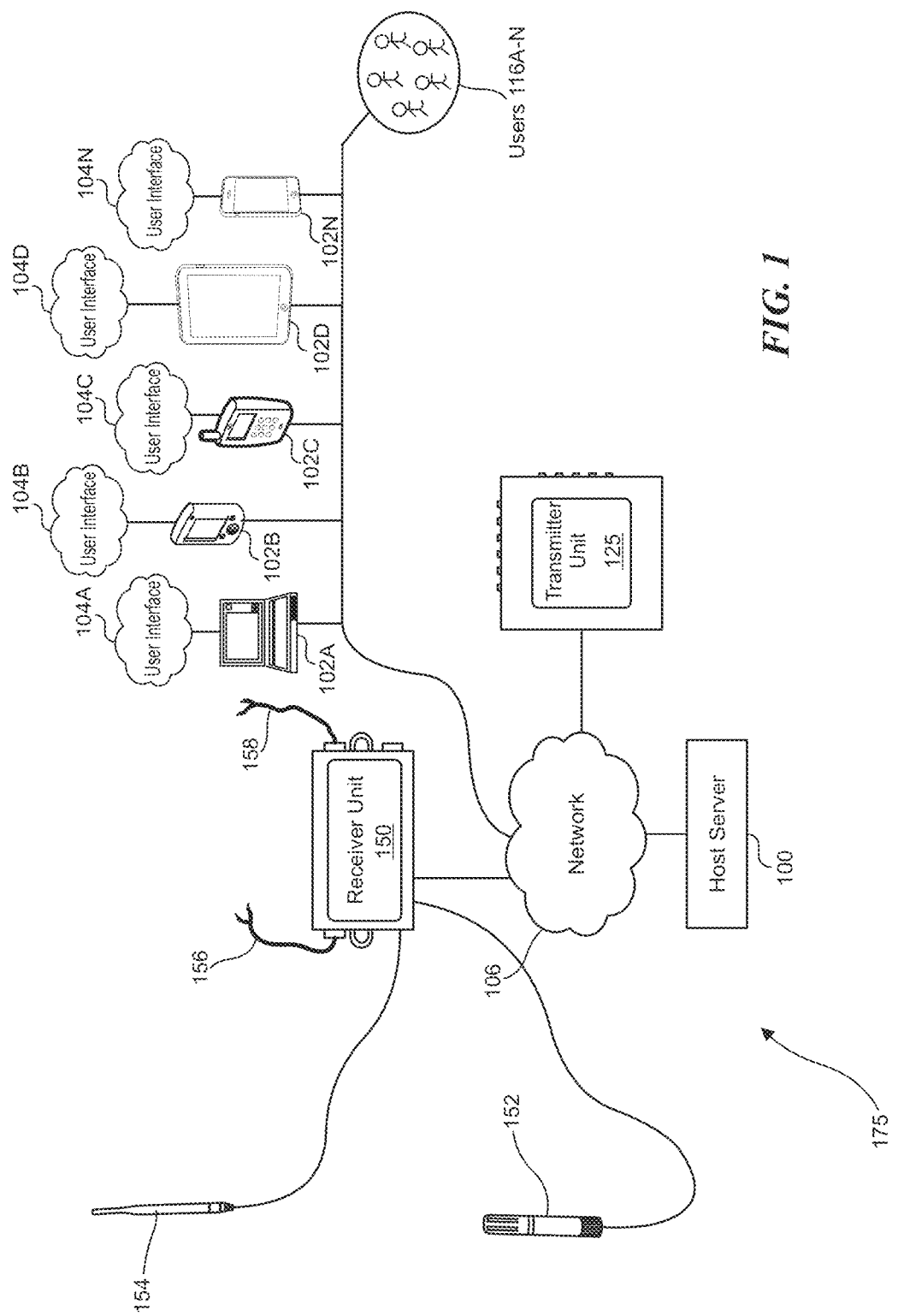
FIG. 1 illustrates an example diagram of a transmitter unit, a receiver unit and/or a host server of the system able to determine differential pressures over a network, in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

In one embodiment, the disclosed system is able to determine a pressure difference between a first physical location and a second physical location. The system can include a transmitter unit to determine a first set of pressure values associated with the first physical location. The system can also generate a synchronization vector. The first set of pressure values can be be transmitted (e.g., by the transmitter unit) to the receiver unit. The pressure values can be transmitted to the receiver unit with the synchronization vector. The first set of pressure values and/or the synchronization vector can be transmitted wirelessly, for example, as UDP packets. TCP/IP or others can also be used. In some instances, the system can include a resistive heater unit for temperature control.

For example, the transmitter unit can include a pressure sensor sensor to obtain the pressure measurements. Note that the pressure sensor generally includes any pressure sensor that senses absolute pressure and can include a MEMS-based (micro-electromechanical system) pressure sensor. The transmitter unit can determine the first set of pressure values through obtaining continuous pressure measurements. In a further embodiment, the system includes another transmitter unit coupled to the receiver unit where the other transmitter unit can obtain another set of pressure values to be transmitted to the receiver unit.

One embodiment further includes a receiver unit coupled to (e.g., wired and/or wirelessly) the transmitter unit. In general, the receiver unit has stored thereon a second set of pressure values associated with the second physical location. While in operation, the receiver unit can use the synchronization vector to align the first set of pressure values with the second set of pressure values, for example, by performing best fit correlation. The receiver unit can also the pressure difference between the first physical location and the second physical location using the first set of pressure values, the synchronization vector, and the second set of pressure values. The pressure difference can then used as an input to drive external equipment to be controlled by the system. For example, the external equipment can be coupled to the receiver unit.

Transmitter unit can be battery powered and/or line voltage operated. In addition, the transmitter unit can include a transmitter antenna that may be internal to the transmitter unit. The transmitter unit can be accessible via a web browser for configuration or testing purposes. The receiver unit can also be battery powered and/or line voltage operated. In a further embodiment, the receiver unit is coupled to a real time clock. Additionally, the receiver unit can include a receiver antenna coupled to the receiver unit. The receiver antenna can be externally coupled to the receiver unit. For instance, the receiver antenna is to be mounted to external equipment being controlled by the system. In embodiment, the receiver unit is accessible via a web browser for configuration or testing purposes.

The disclosed technology includes a system able to measure differential pressures (e.g., via a MEMS sensor) accurately over any distance. The disclosed system is tubeless and the pressure measurement process can be automated. Additionally, the system can compensate for offsets and/or temperature. The system (e.g., transmitter unit(s) and/or the receiver unit) can also perform one or more pre-processing or post-processing algorithms on the data to improve signal quality. For example, the signal quality can be improved by correcting for one or more of, a temperature factor, a noise factor, and/or a drift factor. The signal quality can also be improved by correcting for RF interference. Moreover, the system can improve the signal quality by adapting to an ambient pressure difference and/or an altitude difference.

For example, the system can detect ambient pressure changes or fluctuations over time and process the data to account for such fluctuations. The system can also identity or detect altitude differences between the receiver unit and each of the transmitter units and process the data to account for the difference. The system can also provide a user (e.g., an installer, system administrator/manager, etc.) a menu selection to determine a differential pressure sensitivity output range.

For example, the system can determine differential pressure between one or more areas that may or may not be physically located near each other as well as various components of such system. The system is generally automatic and is implemented without use of a tube. The system can include, among other elements, a transmitter unit (e. g., transmitter device, transmitting device, etc.). The transmitter unit can include, for example, a measurement module and/or a communication module.

The system can also include a receiver unit (e. g., receiver device) able to communicate with the transmitter unit. The receiver unit can include one or more of, a communications module, a control module, a pre-processing module to implement pre-processing algorithms, a post processing module to implement post processing algorithms, and/or a user interface module to input desired scaled pressure range and an optional set of output configurations.

In general the system can include any number of transmitter units able to communicate with a receiver unit (e. g., base receiver, receiving device, receiving device, etc.). For installation, a user (e.g., a system installer) can place one or more transmitter units at various locations of interest. The control module in a transmitter unit can then determine an absolute pressure value at the location of placement or installation. The transmitter unit can then send the pressure value to the receiver unit. The transmitter unit can also generate or determine a synchronization vector which can also be communicated to the receiver unit.

The receiver unit can be placed at a separate area for which the differential pressure measurements, between receiver and transmitter(s), are being tested. The receiver unit (e.g., a control module of the receiver unit) receives pressure values (e.g., transmitter pressure values) from the one or more transmitter unit(s). The receiver unit also measures local pressure values (e.g., receiver pressure values) at a location of the receiver unit or in proximity to the receiver unit. The receiver unit can use the transmitter pressure values received from the transmitter unit as input to the receiver pressure values (e.g. local pressure values) determined by and/or stored at the receiver unit.

The transmitter pressure values and the receiver pressure values can be used to determine the correct vector that is used to synchronize the transmitter unit measurements and receiver unit measurements. The receiver unit (e.g., the control module) performs a best fit to match the synchronized value. A differential value can be derived from the transmitter unit measurements and receiver unit measurements. Note that the transmitter unit pressure measurements and the receiver unit pressure measurements are generally absolute pressure measurements/readings. In addition, post processing algorithms and/or filters can be applied to an output data stream for proportional, integrated, derivative control of closed loop feedback mechanisms. Pre-processing and/or post-processing algorithms can also be applied to the data to filter out any noise.

Embodiments of the present disclosure further include methods for automating, for example, calibration offset, temperature fluctuations, errant scatter points filtering and/or linearization (e.g., 0-10V or any other voltage range) of the voltage over a pressure control range or set pressure point. In addition, proportional, integrated and/or derivative control can provide a continuous variation of output within a control loop feedback to accurately control the process, removing oscillation and/or increasing process efficiency.

Note that the transmitter unit can, for example, be battery operated and can wirelessly communicates with the receiver unit. For instance, the transmitter unit aggregate, measure, determine or compute transmitter data which can include transmitter pressure measurements and/or additional information and can wirelessly transmit transmitter data. The additional information can include various parameters used to time sync pressure measurements with the receiver unit.

The receiver unit can further provide the differential pressure value derived from the transmitter pressure values and the receiver pressure values through additional processes including but not limited to: 0-10Vs, digital parameter over the wireless to communicate to a cloud, an 12 compatible bus, serial, UART, and/or cable.

Advantages of on the present disclosure include providing a differential pressure measurements between different locations, independent of distance between the locations. The differential pressure measurements can be determined at a low cost by using separate micro-electromechanical (e.g., MEMS) based absolute pressure sensor data to perform the processes associated with determining the pressure difference between areas of interest. Moreover, closed loop control can be provided over the system output for control. The system firmware can also be updated over a wireless link to provide future capabilities and/or bug fixes.

FIG. 1 illustrates an example diagram of a transmitter unit 125, a receiver unit 150 and/or a host server 100 of the system 175 able to determine differential pressures over a network 106, in accordance with embodiments of the present disclosure.

The system 175 to obtain measurements can include a sensor (e.g., a MEMS-based sensor) and/or a processor coupled to the sensor. Note that in some instances, a temperature controller can be coupled to the sensor to control the temperature of the sensor. The sensor can include a pressure sensor. The system 175 can further include memory coupled to the processor, where the memory having stored thereon instructions, which when executed by the processor, cna cause the processor to determine, continuously, a local set of pressure measurements from the sensor and/or compare the local set of pressure measurements with an external set of pressure measurements.

The external set of pressure measurements can be received (e.g., via a wired or wireless connection) from one or more remote devices (e.g., transmitter unit(s)). The external set of pressure measurements can be included in data received from at least one of the one or more remote devices. In some embodiments, the data can further include a synchronization vector. The synchronization vector can, for example, generated using time elapsed between a time of measurement of one of the external set of pressure measurements and a time of transmission of packet.

For example, the disclosed system 175 for differential pressure determination includes a transmitter unit 125 (e.g., transmitter device, transmitting device, etc.) and/or a receiver unit 150 (e.g., receiving device, receiver device, etc.). The system 175 can receive data from the transmitter device 125 over a communications link. The system 100 can further decode the protocol and provide the commands to a controller of the system 175. The transmitter unit 125, which can be battery operated, can continuously obtain pressure measurements from a sensor (e.g., a MEMS-based sensor).

To perform synchronization, the transmitter unit 125 can obtain transmitter pressure measurements (e.g., at regular intervals or irregular intervals). The transmitter unit 125 can provide or send the transmitter data including the transmitter pressure measurements to the receiver unit 150. The transmitter unit 125 can also generate or determine a synchronization vector. The synchronization vector can be appended to transmitter data to be sent to the receiver unit 150. The synchronization vector is generated using time elapsed between a time of measurement of one of the external set of pressure measurements (e.g., transmitter pressure measurements) and a time of transmission of packet. The transmitter data can, in one example, be sent wirelessly. For example, the transmitter data can be sent wirelessly. For example, the transmitter data can be sent as UDP packets or via TCP/IP from the transmitter unit 125 to the receiver unit 150 over a wireless link such as Wi-Fi. The transmitter unit 125 can, for example, operate on battery power with use of an internal antenna. In one embodiment, the receiver unit 150 can act as a micro access point for the transmitter unit 125 thus allowing direct Wifi communications between the units.

In general, network 106, over which the transmitter unit 125, the receiver unit 150, the host server 100, the client devices 101A-N and/or various components communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the transmitter unit 125, the receiver unit 150, the host server 100 and may appear as one or more networks to the serviced systems and devices. In one embodiment, communications to and from the transmitter unit 125, the receiver unit 150, the host server 100 can be achieved by an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Lo-Ra, Fixed Wireless Data, 2G, 2.5G, 3G, 4G, 5G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, RF in any MHZ, Zigbee, cable, I$^2$C bus, serial, directly to an application programming interface for cloud based calculations, and/or any other wired, wireless data networks or messaging protocols.

The host server 100 may include internally or be externally coupled to one or more repositories. The repositories can store software, descriptive data, images, system information, drivers, and/or any other data item utilized by other components of the host server 100, the transmitter unit 125, the receiver unit 150 and/or any other devices or servers for operation. The repositories may be managed by a database management system (DBMS), for example but not limited to, Oracle, DB2, Microsoft Access, Microsoft SQL Server, PostgreSQL, MySQL, FileMaker, Non-SQL databases (e.g. Mongo and DynamoDB) etc.

The repositories can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In general, the transmitter unit 125 can be battery and/or line voltage operated. The transmitter unit can also support a visual method to test the communication link provided via the network 106, configure the transmitter unit 125, and/or confirm operation. For example, the capability can be provided through the host server 100. Note that the host server 100 can be external to the transmitter unit 125. The functions performed by the host server 100 can also be partially or wholly integrated in the receiver unit 150 and/or the transmitter unit 125. Software modules and/or hardware components of the host server 100 can be partially or wholly embedded in the receiver unit 150 and/or the transmitter unit 125.

In one embodiment, the host server can 100 be accessed by a user (e.g., installer, administrator, user 116A-N etc.) through a client device (e.g., client device 102A-N), for example, via a browser or application accessed through a user interface (e.g., user interface 104A-N). Therefore the user 116A-N can use the client device 102A-N that is remote from the transmitter unit 125 to configure, operate and/or test the transmitter unit 125. The transmitter unit 125 can also include audio output or input capabilities notify the user 116A-N of low battery or other alert conditions.

The receiver unit 150 can be battery and/or line voltage operated. The receiver unit 150 can also provide a visual method to test the communication link provided via the network 106, configure the receiver unit 150, and/or confirm operation. For example, the capability can be provided through the host server 100. Note that the host server 100 can be external to the receiver unit 150. The functions performed by the host server 100 can also be partially or wholly integrated in the receiver unit 150. Software modules and/or hardware components of the host server 100 can be partially or wholly embedded in the receiver unit 150. The host server 100 can be accessed through a browser by a user (e.g., installer, administrator, user 116A-N etc.). Therefore, user 116A-N can use the client device 102A-N that is remote from the receiver unit 150 to configure, operate and/or test the receiver unit 150.

In one embodiment, the receiver unit 150 receives or captures transmissions from the transmitter unit(s) 125. The receiver unit 150 can then perform various synchronization steps to align sensor readings from transmitter unit(s) 125 with local readings stored at the receiver unit 150.

In this embodiment, the receiver unit 150 is coupled to an antenna 154. In one embodiment, the antenna 154 can be mounted externally to equipment being controlled. The sensor 152 coupled to the receiver unit 150 can also be remote. The sensor 152 enables capture of sensor data in an area external to the equipment being controlled. The equipment to be controlled can, for example, be connected by a wire or wires 154 to an analog or digital control signal from the receiver unit 150. In one embodiment, the receiver unit 150 can be line powered by the equipment being controlled (e.g. via power lead 156).

The client devices 102A-N can be any system and/or device, and/or any combination of devices/systems that is able to establish a connection with another device, a server and/or other systems. Client devices 102A-N each typically include a display and/or other output functionalities to present information and data exchanged between among the client devices 102A-N, the transmitter unit 125, the receiver unit 150 and the host server 100.

For example, the client devices 102A-N can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, a wearable device, a head mounted device, a smart watch, a goggle, a smart glasses, a smart contact lens, and/or any other portable, mobile, hand held devices, etc. The input mechanism on client devices 102A-N can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), eye tracking, eye detection, pupil tracking/detection, or a combination of the above.

The client devices 102A-N, its respective networks of users 116A-N, the transmitter unit(s) 125, the receiver unit 150 and/or host server 100, can be coupled to the network 106 and/or multiple networks. In some embodiments, the client devices 102A-N and host server 100 may be directly connected to one another. Similarly, the host server 100 can alone or in combination with the transmitter unit 125 and/or the receiver unit 175 perform the functionalities for differential pressure determination and equipment control.

Figure 2:
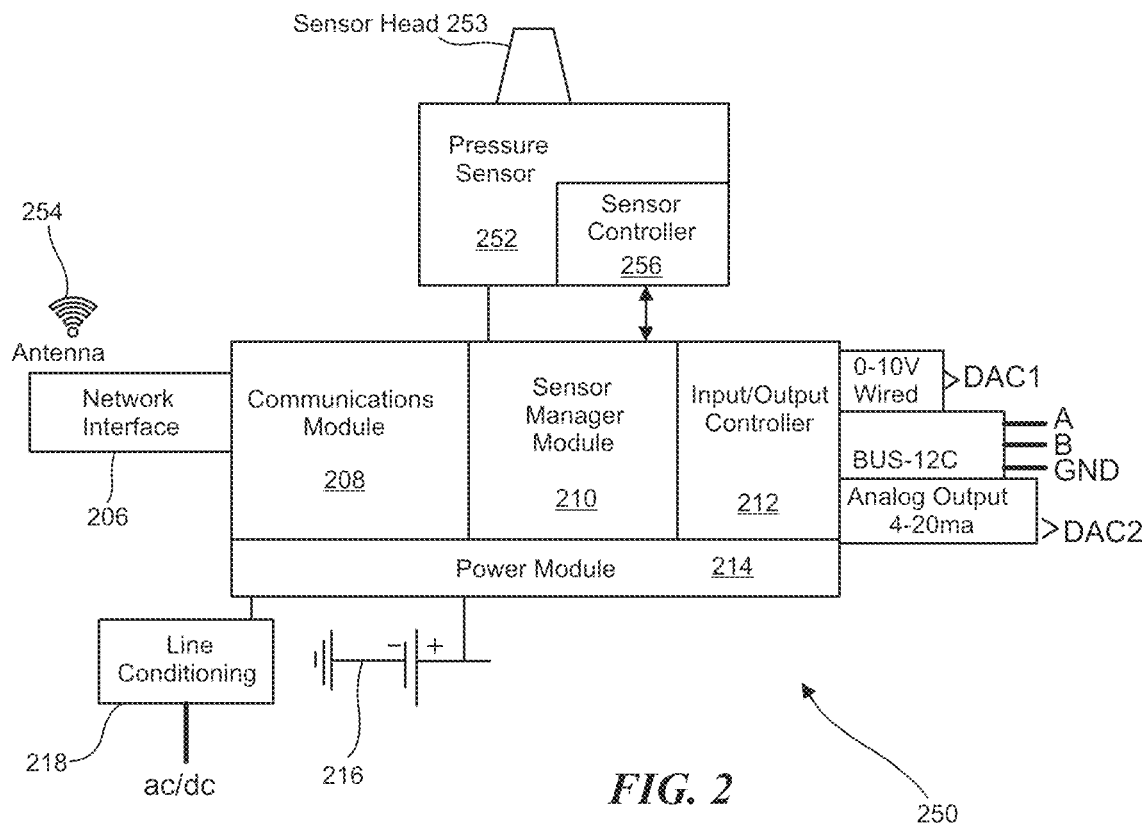
FIG. 2 depicts an example block diagram of a receiver unit of a system for differential pressure determination and control, in accordance with embodiments of the present disclosure.

FIG. 2 depicts an example block diagram of a receiver unit 250 of a system for differential pressure determination and control, in accordance with embodiments of the present disclosure.

The receiver unit 250 includes a network interface 206, a communications module 208, a sensor manager module 210, an input/output controller 212, a power module 214, a pressure sensor 252. The pressure sensor 252 can include a sensor head. The receiver unit 250 can also be coupled to an antenna 254 which can be internal to the receiver unit 250 or externally coupled to the receiver unit 250.

Additional or less modules can be included without deviating from the techniques discussed in this disclosure. In addition, each module in the example of FIG. 2 can include any number and combination of sub-modules, and systems, implemented with any combination of hardware and/or software modules.

The receiver unit 250, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

The network interface 206 can be a networking module that enables the receiver unit 250 to mediate data in a network with an entity that is external to the receiver unit 250, through any known and/or convenient communications protocol supported by the host and the external entity. The network interface 206 can include one or more of a network adaptor card, a wireless network interface card (e.g., SMS interface, WiFi interface, interfaces for various generations of mobile communication standards including but not limited to 1G, 2G, 3G, 3.5G, 4G, LTE, 5G, etc.,), Bluetooth, a router, an access point, a wireless router, a switch, a multilayer switch, a protocol converter, a gateway, a bridge, bridge router, a hub, a digital media receiver, and/or a repeater.

As used herein, a "module," a "controller," a "manager," an "agent," a "tracker," a "handler," a "detector," an "interface," or an "engine" includes a general purpose, dedicated or shared processor and, typically, firmware or software modules that are executed by the processor. Depending upon implementation-specific or other considerations, the module, controller, manager, tracker, agent, handler, or engine can be centralized or have its functionality distributed in part or in full. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, flash, optical storage, to name a few), but may or may not be limited to hardware.

In general, the communications module 208 can provide secure and reliable communications between the receiver unit 250 and the transmitter devices (e.g., transmitter device 125 shown in the example of FIG. 1). The communication can be provided via radio, Wi-Fi, Bluetooth, infrared and/or acoustics. Communications protocols specific to the wireless medium can be executed over the link for security, flow control, reliability, signal strength determination and other wireless features. In a further embodiment, the communications control module 208 can also configure and/or control the antenna 254. Note the antenna 254 can be internal to or external to the receiver unit 250.

In one embodiment, an out of band processing can be performed to update the firmware for the processor (e.g., a microcontroller) of the receiver unit 250 (e.g., on the communications module 208 or any other component(s)). The receiver module 250 can verify the integrity of the binary image prior to its loading into the processor memory and/or the communications controller operating memory. One embodiment of the receiver unit 250 further includes a real time clock to provide required time out and user designated drying time requirements.

After data reception, the communications module 208 can send the data to the sensor management module 210. In one embodiment, the receiver unit 250 receives transmitter pressure measurements from one or more transmitter units. The receiver unit 250 can compare the transmitter pressure measurements with the receiver pressure measurements obtained by the receiver unit 250 (e.g., via the pressure sensor 252). The receiver unit 250 can use a synchronization vector to determine the pressure difference between the transmitter pressure measurements and the receiver pressure measurements.

The sensor manager module 210 can manage the power, reliability and/or data integrity of the pressure sensor 252. These functions can be performed, for example, through the sensor controller 210. The functions performed by the sensor manager module 210 can include calibration, temperature, production offsets and other sensor specific values that can impact the integrity of the differential pressure between the transmitter pressure measurements and the receiver pressure measurements.

Using the differential pressure between the transmitter pressure measurements and the receiver pressure measurements, the sensor manager module 210 can drive the input/output controller 212 using a value that is proportional to the differential pressure. For example, the receiver unit 250 can receive transmitter pressure measurements from any number of transmitter units (e.g., 1 transmitter unit, 2 transmitter units, 3 transmitter units, 4 transmitter units, n-transmitter units, etc.). The receiver unit 250 also obtains receiver pressure measurements by the pressure sensor 252.

The system (e.g., the receiver unit 250 via input/output controller 212) is generally compatible with various forms of analog and/or digital outputs with equipment to be controlled by the system. The output controller 212 can include software modules and/or hardware components for, for example, 0-10V analog, 2-40 ma current, I2C Digital, UART serial or other output.

The power module 214 is able to manage, provide and/or provision both line and/or battery power to the receiver unit 250. The power module 214 can provide proper management of the receiver if under battery operation by battery 216 or power isolation if the receiver unit 250 is line powered 216.

Figure 3:
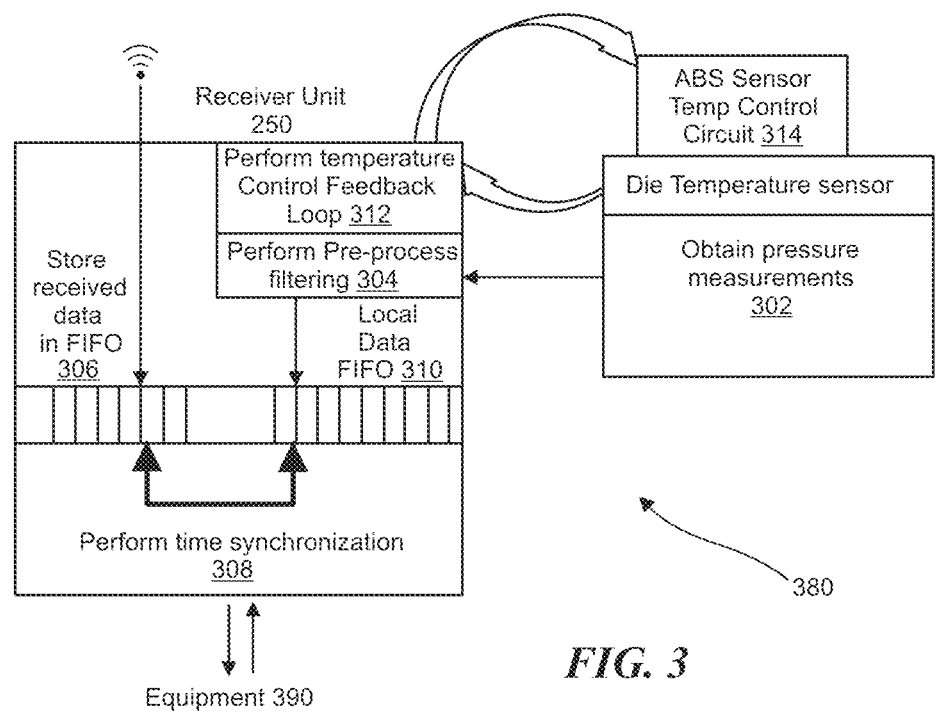
FIG. 3 depicts a logical flow diagram illustrating an example process to determine differential pressure measurements by a system having a receiver unit and one or more transmitter units, in accordance with embodiments of the present disclosure.

FIG. 3 depicts a logical flow diagram 380 which illustrates an example process to determine differential pressure measurements by a system having a receiver unit and one or more transmitter units, in accordance with embodiments of the present disclosure.

In process 302, receiver pressure values are measured from by a receiver unit and transmitter pressure values are measured by a transmitter unit. The receiver unit and the transmitter unit can each obtain pressure measurements continuously from a pressure sensor. In process 304, pre-process filtering, for example, is performed to improve data integrity and reliability. In one embodiment, smart data filtering is performed for out of band or scattered data points. Additionally data transformation, such as a Fast Fourier Transform (FFT) can also be performed.

In process 306, data from the pressure sensor can be read and stored in a First In First Out (FIFO) or similar data storage structure, for example, a ring buffer. In one embodiment, the FIFO data is held in RAM prior to being written into the ring buffer until a synchronization vector is appended to the measured pressure value. Transmitter data which can include, for example, transmitter pressure measurements and the synchronization vector is sent by the transmitter unit to the receiver unit. The receiver unit then receives and stores the transmitter data into a FIFO or similar data storage structure in process 306.

The pressure measurement can, for example, be taken by the transmitter unit for an arbitrary amount of time before packet transmission can be synchronized in time with a receiver pressure measurement taken by or near the receiver unit in the system. The disclosed system can compensate for transmission delay and reception process. For instance, when the reception process is wireless, it can be subject to RF issues that can arise in the reception which may cause the data being transmitted or received to be lost or corrupted. Therefore, the system (e.g. the receiver unit) can perform processes for the identification of lost, dropped or corrupt packets of data. The disclosed system can also account for the elapsed time between receiver unit and transmitter unit measurements times. In process 308, time synchronization is performed by the receiver unit. For example, the output from performing time synchronization can be used to look back through the pressure measurement ring buffer to identify the best-fit correlation value with the receiver device measurement stored in the local FIFO buffer 310.

Embodiments of the present disclosure include processes to derive synchronization vectors and/or to perform time synchronization. One embodiment includes generating a synchronization vector using the time elapsed between the measurement and transmission of a data packet. For example, a synchronization vector can be generated by subtracting the receive timestamp from the measurement delay.

In general, each measurement can include a pressure value measurement and a synchronization vector. The buffer can store multiple measurements each spaced some time apart from one another (e.g., microseconds, milliseconds, seconds, etc.). The measurement time of a remote packet (e.g., data packet received from one or more transmitter units) can be estimated. The estimation can be performed by, for example, subtracting the received timestamp from the measurement delay (e.g., determining time elapsed between measurement and transmission of data packets). Using the measurement time, the appropriate measurement in the FIFO can be determined by counting back ((Time Received—Measurement Delay)/10) measurement entries. For example, the transmission delay can be added to determine the FIFO entry point. This measurement can be used to compare with the measurement received from the remote sensor since these two measurements can generally be taken within milliseconds of each other. In addition, security processing can be performed for privacy, authentication and/or non-repudiation services. The security processing can be performed by the transmitter unit and/or the receiver unit.

In process 312, a feedback loop for temperature control of the sensor die is performed. Due to the impact of temperature on MEMS based (e.g., micro-electromechanical system) sensor pressure readings, the process a continuous feedback method to control sensor die temperature to stabilize and improve the sensor output for optimized data integrity and reliability. Since the temperature impacts the sensors during steady-state operation, the effect of temperature variation is compensated for. One embodiment, includes controlling the physical temperature of the sensor die through a closed feedback loop in process 312 with die temperature control process and temperature control circuitry 314. The temperature control circuity 314 can include, for example, resistive heater components and modules to maintain the temperature (e.g., fixed temperature or temperature range) of the MEMS sensor die.

Figure 4:
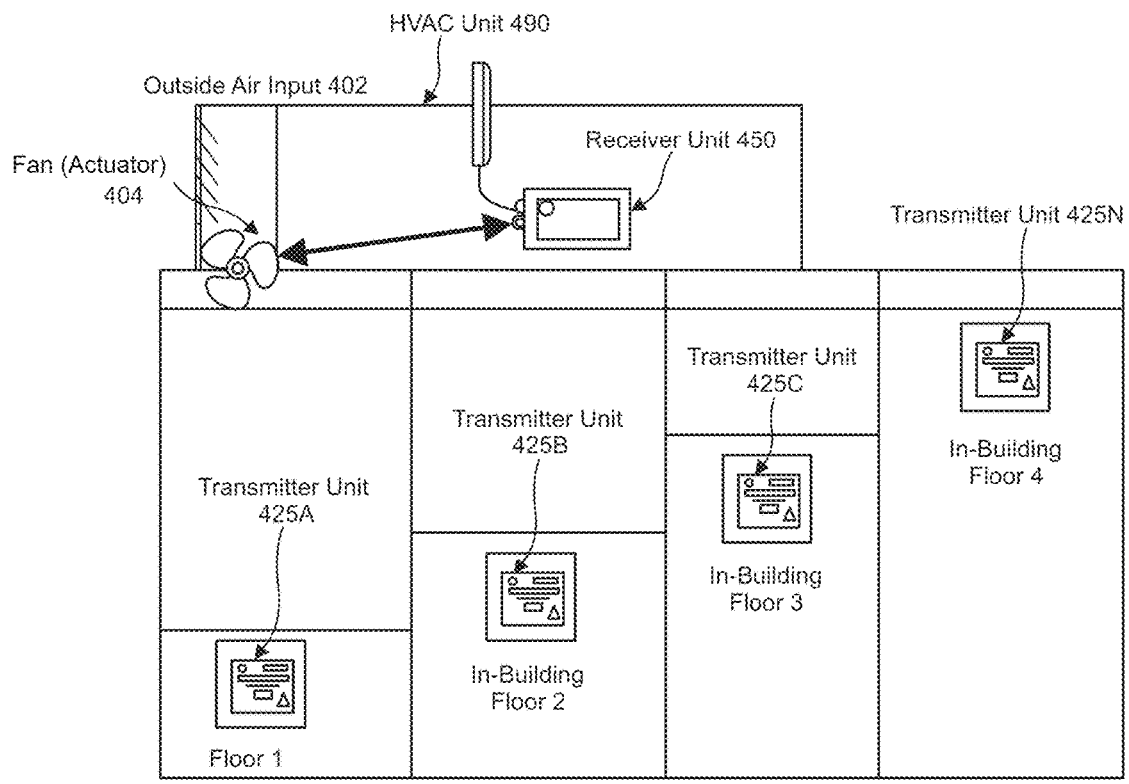
FIG. 4 depicts a schematic of a system for differential pressure determination coupled to equipment that is to be controlled by the system, in accordance with embodiments of the present disclosure.

FIG. 4 depicts a schematic of a system 475 for differential pressure determination coupled to equipment 490 that is to be controlled by the system 475, in accordance with embodiments of the present disclosure.

The system 475, in one embodiment, includes a receiver unit 450 and multiple transmitter units 425A-N. The system 475 can be, for instance, coupled to the equipment 490 (e.g., a Heating Ventilation Air Conditioning (HVAC) unit on a rooftop) and can control the building indoor pressure by determining the differential pressure between air pressure outside of the building 402 and inside of the building. The system 475 can then control an input air damper/exhaust fan on the HVAC unit 490 via an actuator 404 (e.g., a fan, pumps, etc.) or other equipment (e.g., through wired or wireless connection).

Therefore, the differential pressure determined by the system 475 can be used to drive an output to equipment 490. In general the system 475 can resolve multiple differential pressure values from one or more transmitter units 425A-N. The distance between the receiver unit 450 (which may be on a rooftop) and each of the transmitter units 425A-N can be any value, for example, from centimeters, or one to many meters, or 10's of meters in altitude. The distance can, for example, cause the measurements obtained by the sensors to reflect a static differential pressure. Therefore, to compensate for such a differential, a calibration to a "zero" offset can, for example, be determined between sensors while the equipment 490 is in a steady state (e.g., when the equipment is not pressurizing the space).

Embodiments of the present disclosure includes a process for zero-offset determination where the receiver unit 450 drives the equipment 490 to steady state. When the receiver unit 450 detects pressure stabilization between outside and the indoor spaces, pressure values from the transmitter units 425A-N can be read and compared with pressure measurements taken by the receiver unit 450. The offset values can be recorded. In one embodiment, the average offset value is determined and subtracted from the difference to create a steady state pressurization condition and can be used to calculate the zero offset value between the sensors. A further embodiment includes, determining drift between sensors (e.g., dynamically) by, for example, using the zero-offset calibration to control the drift between MEMs sensors.

Figure 5:
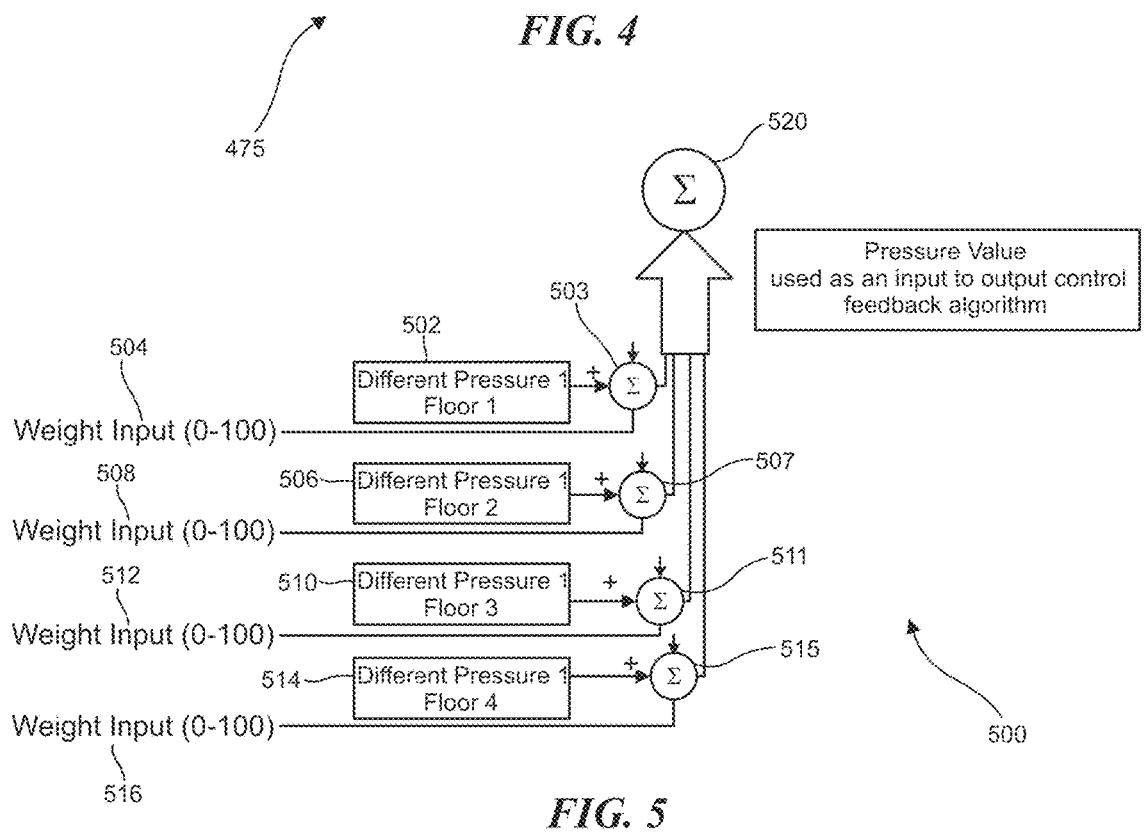
FIG. 5 depicts an example flow to determine an output value used to drive a single output control from multiple transmitter pressure values, in accordance with embodiments of the present disclosure.

FIG. 5 depicts an example flow 500 to determine an output value 520 used to drive a single output control from multiple transmitter pressure values, in accordance with embodiments of the present disclosure.

In one embodiment, a receiver unit (e.g. the receiver unit 150 of the example of FIG. 1, receiver unit 250 of FIG. 2, receiver unit 450 of FIG. 4) receives measurements from one or more transmitter units (e.g. transmitter unit 125 of the example of FIG. 1, transmitter units 425A-N of FIG. 4). The receiver unit generally also obtains its own pressure measurements.

The output value can be generated by performing one or more of averaging and clipping the first and second pressure value the output value is generated by performing one or more of averaging and clipping the first and second pressure values. In one embodiment, a weighed value can be applied to each derived differential transmitter value to be used by the input to the control algorithm. As shown in flow 500, the value from the first transmitter-receiver pair 502 is summed together with a weight value 504 to form an output 503 from this pressure reading. This is repeated for the transmitter in location two 506 (e.g., with weight value 508), the transmitter in location three 510 (e.g., with weight value 512) and the transmitter of location four 514 (e.g., with weight value 514). Note that, in this example, the sum of the weighted values add to 100.

The contribution from each transmitter/receiver pair (e.g., values 503, 507, 511 and 515) can then be summed together to generate the output value 520. The output value 520 can then be used as an input to the output control feedback algorithm. The weight values (e.g., weight values 504, 508, 512 and/or 516, etc.) can be an input configured or set during installation, and may be reconfigurable/adjustable. The weight values can also be set to use the lowest or highest value from the pairs or other weighted combinations. In addition, the highest and/or the lowest transmitted data values may also be selected as input to the output control feedback algorithm.

Figure 6A:
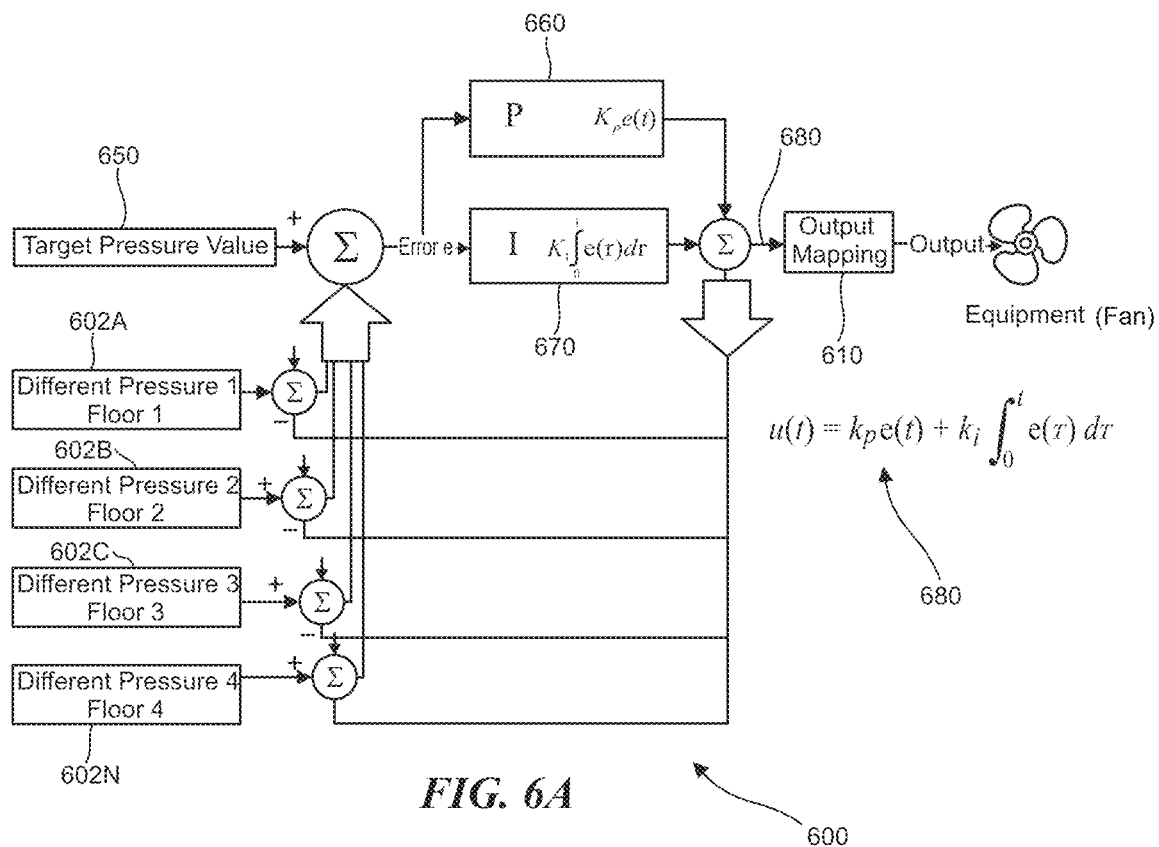
FIG. 6A depicts an example flow to maintain a set pressure point for controlling equipment, in accordance with embodiments of the present disclosure.

FIG. 6A depicts an example flow 600 to maintain a set pressure point for controlling equipment, in accordance with embodiments of the present disclosure.

In one embodiment, a first pressure difference between a first transmitter pressure value and a receiver pressure value is determined. The first transmitter pressure value can be measured by a first transmitter device and the receiver pressure value can be measured by the a receiver device. A second pressure difference between a second transmitter pressure value and a second receiver pressure value can also be determined. The second transmitter pressure value can be measured by a second transmitter device and the second receiver pressure value can be measured by the receiver device.

A first differential value can be determined by applying a first weight to the first pressure difference. A second differential value can also be determined by applying a second weight to the second pressure difference. An output value used to drive a single output control can then be generated from the first differential value and the second differential value. In one example, the first and second differential values are summed to generate the output value. Note that additional differential values can be determined from additional transmitter units for use in generating the output value.

In a further embodiment, an error value ('e') can be determined using the output value and a target pressure value. A proportional error value ('P' 660) can be determined using the error value e and a first coefficient (e.g., kp). An integral error value ('I' 670) can be determined using the error value e and a second coefficient (e.g., ki). A weighted error term u(t) can be determined using the proportional error value and the integral error value.

For example, a further embodiment of the present disclosure includes a feedback loop with error correction. The feedback loop can run continuously to stabilize and smooth the output. The process can also include an output mapping function that can linearize and scale the output values, for example, based on the installation space characteristics. In one embodiment, a target pressure value 650 can be configured as an input. The proportional coefficient kp and/or the integral coefficient ki can be determined as a function of the feedback algorithm. kp and/or ki can also be set to default values. A user/installer can specify kp and ki externally.

The feedback loop can use the target pressure value 650 and the weighted resultant differential pressure value calculated from each receiver/transmitter pair 602A-N. The proportional coefficient kp can be configured to specify the size of step changes towards the target pressure value 650 and can be used, for example, to prevent over-control of the equipment. The integral coefficient ki can be configured to maintain a running average of a number of outputs that is fed-back for error correction to smooth the output value.

The error value 'e' can initially be determined by calculating the difference between the target pressure value 650 and a current differential measurement. The proportional error P 660 is then determined by calculating the product e*kp. Likewise, the integral error I 670 is then determined by calculating the product of the integral coefficient ki and the integral of error terms. For instance, the integration of error terms can be approximated by calculating the average of the multiple (e.g., last 5, 10, 15, 20, 100, 1000, etc.) error terms. A weighted error term u(t) as a function of time (t) can then be continuously calculated by summing the calculated error terms as shown in equation 680.

Figure 6B:
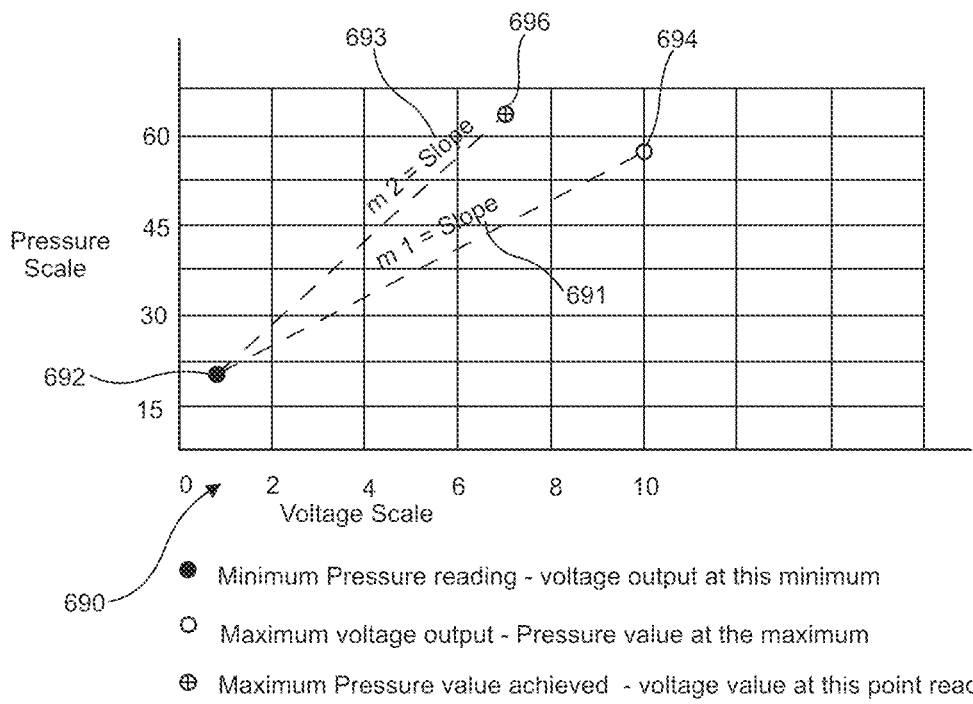
FIG. 6B illustrates how the values used by the output mapping process can be derived from the pressurization testing, in accordance with embodiments of the present disclosure.

The weighted error term u(t) of 680 can be provided as an input to output mapping process 610. The output mapping process 610 can match the impedance of the building space pressurization characteristics, derived through pressure testing, with the output drive of the system. The output mapping can ensure that the full range of pressurization is matched with the space pressurization rate. The example chart 690 of FIG. 6B illustrates how the values used by the output mapping process 610 can be derived from the pressurization testing.

One embodiment of the present disclosure includes use of a mobile application (e.g., an application accessed via client devices 102A-N of the example of FIG. 1) or cloud based server (e.g., via the host server 100 of the example of FIG. 1) to initiative pressurization testing and aid in the determination of these parameters. After the transmitter units and the receiver units are installed, under external control of a mobile or a cloud application, the space characteristic testing can be performed through pressurization of a building. By determining the slope associated with the ramp up to a fully pressurized, the pressure system characteristics can be determined.

For instance, the building space can be characterized for minimum pressure value and the output control voltage value at that pressure is detected by the system. For instance, data point 692 depicts the voltage reading where an initial valid pressure reading is detected. The test continues to pressurize the space to additional pressure points 694 in the space and identifying the voltage value at such pressure points. For example, using the voltage value at point 694 enables the slope ml 691 between to be determined.

During this portion of the test, time to pressurize is also measured. Maximum pressure is generally space dependent and can be achieved when the output to the pressurization system is maximum or when the system can not be further pressurized even if the output is not at the maximum. This graphical method ecan be applied to derived minimum and maximum pressure/power readings and forming a linear relationship. The resulting line between the a data point 692 and a second data point 694 (e.g., which can be a maximum pressure point or any other pressure point during the pressure ramp up) can then used to measure a slope 691. This slope and the time basis can be used in the output mapping to pressurize the space using PI control that is tailored to the installation of the system. Note that a different pressurization measurement (e.g., for a different site or building) can yield a different slope 693.

Figure 7:
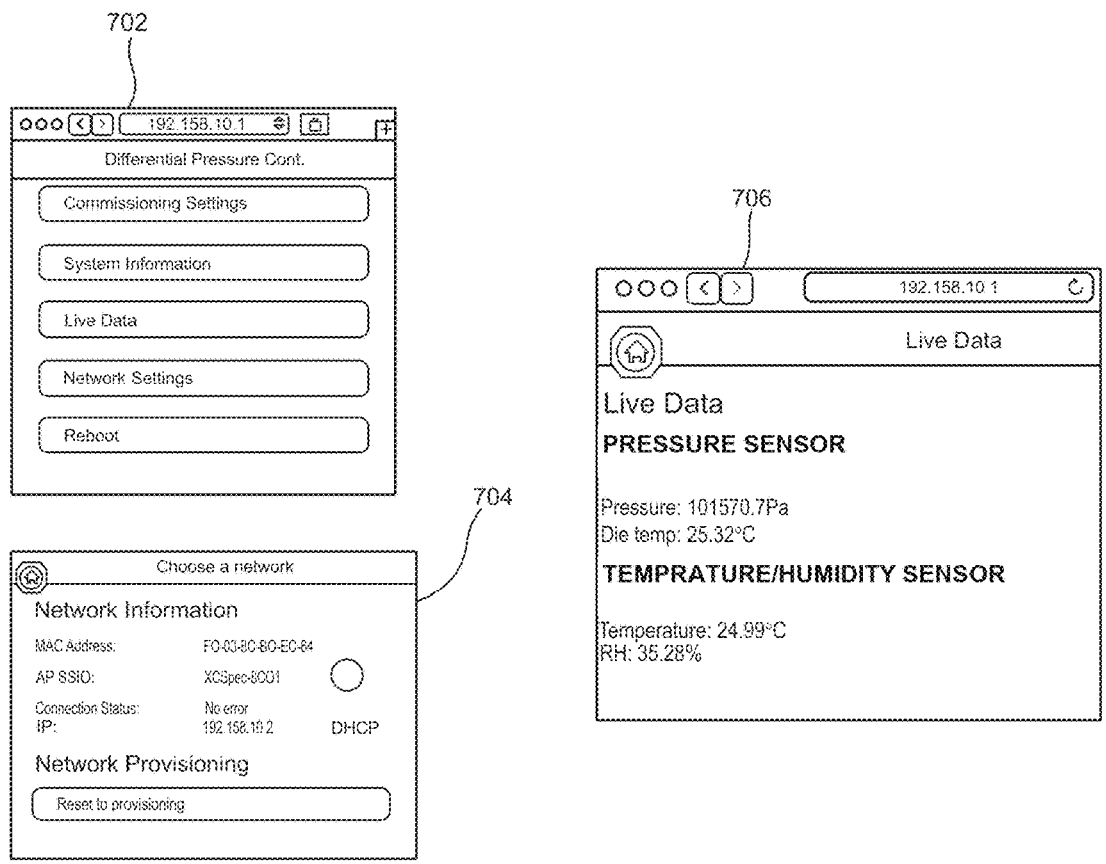
FIG. 7 depicts example user interfaces to to facilitate configuration, installation of a system for differential pressure determination and control and/or verification of operation of the system, in accordance with embodiments of the present disclosure.

FIG. 7 depicts example user interfaces to to facilitate configuration, installation of a system for differential pressure determination and control and/or verification of operation of the system, in accordance with embodiments of the present disclosure.

Note that in general, the system for differential pressure determination and control is connected to a network. For example, the system can include an access point such as a micro-access point (micro-AP) where the transmitter unit(s) of the system can be provisioned directly to the receiver unit.

In one embodiment, the transmitter unit of the system can be accessible or managed via a user interface (e.g., user interfaces 104A-N as shown in the example of FIG. 1). For example, the user interface "Home Page" 702 can depict a list of options available for system configuration or verification. For example, verification that the transmitter unit is connected to a receiver unit can be provided on the "Network Settings" page 704. Via page 704, the user can confirm that the transmitter unit has successfully formed a connection with the receiver unit. In addition, data from the pressure sensor and/or temperature sensor of the transmitter unit can also be accessed or viewed on the "Live Data Page" 706.

Figure 8:
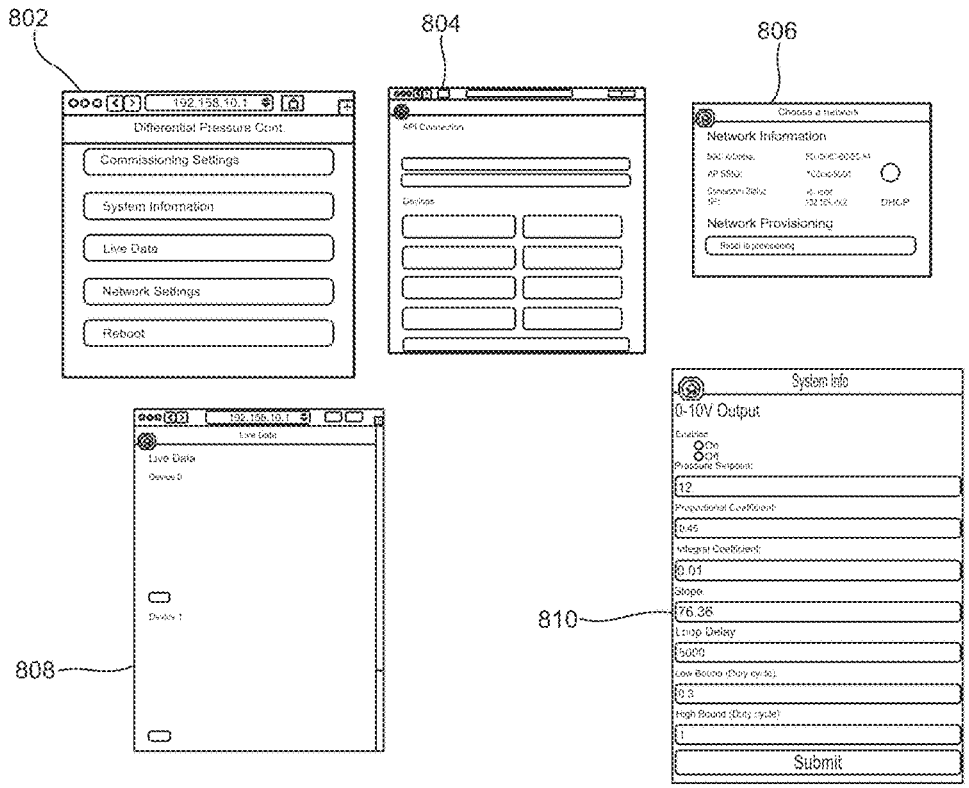
FIG. 8 depicts example user interfaces to facilitate configuration of output control by a receiver unit of the system, in accordance with embodiments of the present disclosure.

FIG. 8 depicts example user interfaces to facilitate configuration of output control by a receiver unit of the system, in accordance with embodiments of the present disclosure.

For example, user interface 802 (e.g., "Home Page") depicts a list of options available for a user. The user (e.g., an installer, system admin, user 116A-N as shown in the example of FIG. 1) can assign transmitters and an associated "weighted value" to receivers through user interface 804 (e.g., the "Network Settings" page). User interface 804 can be used to verify that the receiver unit of the system is connected to the Internet. Data from the receiver unit and each assigned transmitter unit can be displayed on the "Live Data Page" 808. For example, data associated Device 1 shown in 808 can depict a first Transmitter data received and used by the receiver and data associated Device 0 shown in 808 can depict a second Transmitter data received and used by the receiver User interface 810 (e.g., the "Commissioning Settings" page) can, for example, provide features for the user to perform the system commissioning functions. For example, the user can configure, set, adjust, customize, or enter kp coefficient and/or ki coefficient. System calibration can also be initiated and conducted through user interface 810. Default system values can be adjusted or overridden via the user interface 810. The user interfaces can also facilitate execution of the space characteristic tests, achieving zeroing between absolute pressure sensors and enabling configuration or adjustment of PI and output control parameters.

Figure 9:
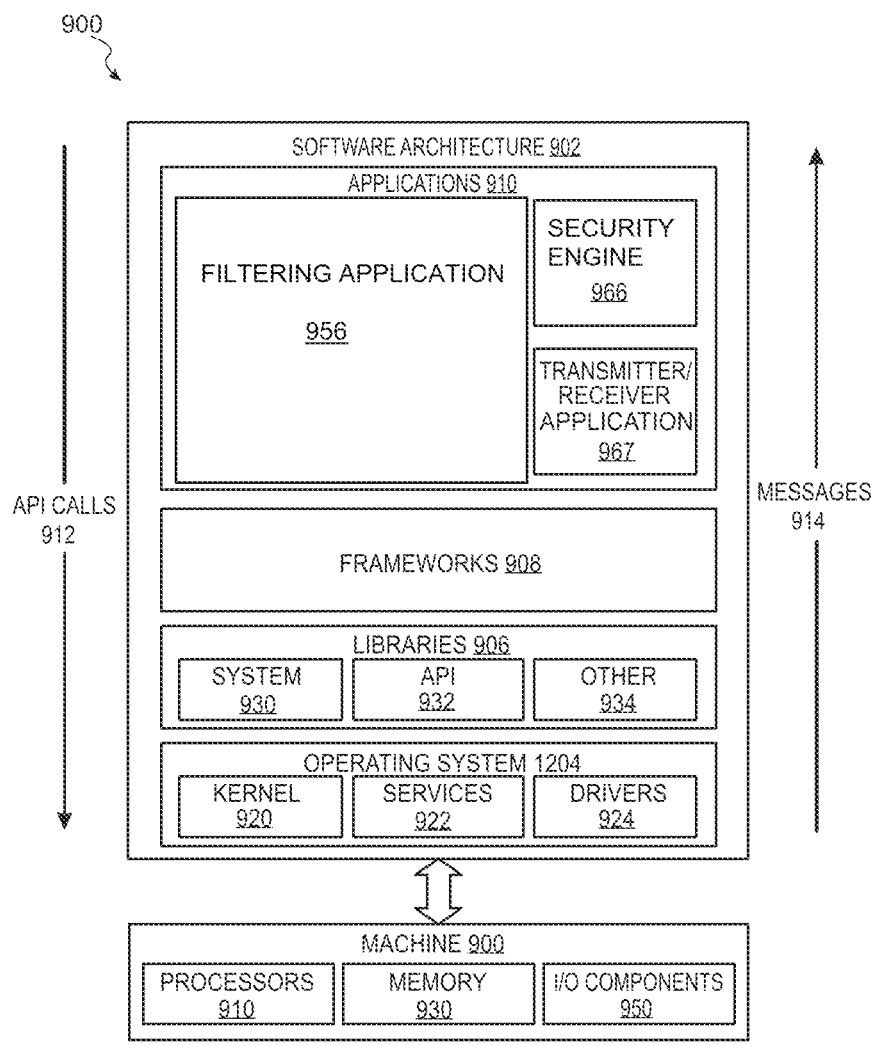
FIG. 9 is a block diagram illustrating an example of a software architecture that may be installed on a machine, in accordance with embodiments of the present disclosure.

FIG. 9 is a block diagram illustrating an example of a software architecture 900 that may be installed on a machine, in accordance with embodiments of the present disclosure.

FIG. 9 is a block diagram 900 illustrating an architecture of software 902, which can be installed on any one or more of the devices described above. FIG. 9 is a non-limiting example of a software architecture, and it will be appreciated that many other architectures can be implemented to facilitate the functionality described herein. In various embodiments, the software 902 is implemented by hardware such as machine 1000 of FIG. 10 that includes processors 1010, memory 1030, and input/output (I/O) components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke API calls 912 through the software stack and receive messages 914 in response to the API calls 912, in accordance with some embodiments.

In some embodiments, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, Bluetooth drivers, flash memory drivers, serial communication drivers (e.g., Universal Serial Bus (USB) drivers), WI-FI drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematics functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include, a filtering application 956, and/or a security engine 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the security engine 966 (e.g., an application developed using the Android, Windows or iOS. software development kit (SDK) by an entity other than the vendor of the particular platform) may be mobile software running on a mobile operating system such as Android, Windows or iOS, or another mobile operating systems. In this example, the security engine 966 can invoke the API calls 912 provided by the operating system 904 to facilitate functionality described herein.

A transmitter/receiver application 967 may implement any system or method described herein, including differential pressure determination and control, or any other operation described herein.

Figure 10:
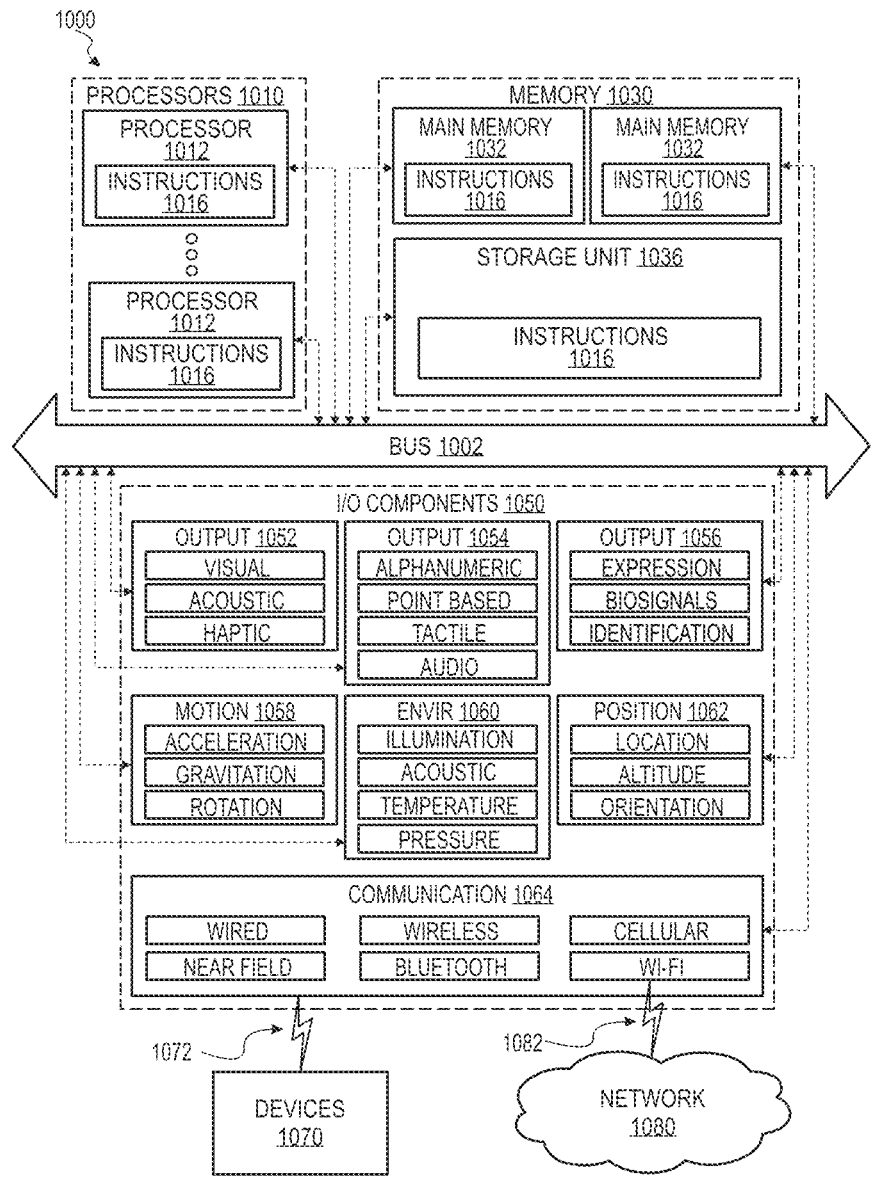
FIG. 10 is a block diagram illustrating components of a machine, according to some example embodiments, able to read a set of instructions from a machine-readable medium (e.g., a machine-readable storage medium) and perform any one or more of the methodologies discussed herein.

FIG. 10 is a block diagram illustrating components of a machine 1000, according to some example embodiments, able to read a set of instructions from a machine-readable medium (e.g., a machine-readable storage medium) and perform any one or more of the methodologies discussed herein.

Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. Additionally, or alternatively, the instruction can implement any module of FIG. 2 and any module of FIG. 3, and so forth. The instructions transform the general, non-programmed machine into a particular machine programmed to carry out the described and illustrated functions in the manner described.

In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a head mounted device, a smart lens, goggles, smart glasses, a smart home device (e.g., a smart appliance), other smart devices, a web appliance, a network router, a network switch, a network bridge, a Blackberry, a processor, a telephone, a web appliance, a console, a hand-held console, a (hand-held) gaming device, a music player, any portable, mobile, hand-held device or any device or machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 can include processors 1010, memory/storage 1030, and I/O components 1050, which can be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 1012 and processor 1014 that may execute instructions 1016. The term "processor" is intended to include multi-core processor that may comprise two or more independent processors (sometimes referred to as "cores") that can execute instructions contemporaneously. Although FIG. 10 shows multiple processors, the machine 1000 may include a single processor with a single core, a single processor with multiple cores (e.g., a multi-core processor), multiple processors with a single core, multiple processors with multiples cores, or any combination thereof.

The memory/storage 1030 can include a main memory 1032, a static memory 1034, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 can also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of the processors 1010 are examples of machine-readable media.

As used herein, the term "machine-readable medium" or "machine-readable storage medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" or "machine-readable storage medium" should be taken to include a single medium or multiple media (e.g., a centralized or distributed database, or associated caches and servers) able to store instructions 1016. The term "machine-readable medium" or "machine-readable storage medium" shall also be taken to include any medium, or combination of multiple media, that is capable of storing, encoding or carrying a set of instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" or "machine-readable storage medium" refers to a single storage apparatus or device, as well as "cloud-based" storage systems or storage networks that include multiple storage apparatus or devices. The term "machine-readable medium" or "machine-readable storage medium" excludes signals per se.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The I/O components 1050 can include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 can include many other components that are not shown in FIG. 10. The I/O components 1050 are grouped according to functionality merely for simplifying the following discussion and the grouping is in no way limiting. In example embodiments, the I/O components 1050 can include output components 1052 and input components 1054. The output components 1052 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), eye trackers, and the like.

In further example embodiments, the I/O components 1052 can include biometric components 1056, motion components 1058, environmental components 1060, or position components 1062 among a wide array of other components. For example, the biometric components 1056 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 can include acceleration sensor components (e.g., an accelerometer), gravitation sensor components, rotation sensor components (e.g., a gyroscope), and so forth. The environmental components 1060 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 can include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or other suitable device to interface with the network 1080. In further examples, communication components 1064 include wired communication components, wireless communication components, cellular communication components, Near Field Communication (NFC) components, Bluetooth. components (e.g., Bluetooth. Low Energy), WI-FI components, and other communication components to provide communication via other modalities. The devices 1070 may be another machine or any of a wide variety of peripheral devices (e.g., a peripheral device coupled via a USB).

The network interface component can include one or more of a network adapter card, a wireless network interface card, a router, an access point, a wireless router, a switch, a multilayer switch, a protocol converter, a gateway, a bridge, bridge router, a hub, a digital media receiver, and/or a repeater.

The network interface component can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Moreover, the communication components 1064 can detect identifiers or include components operable to detect identifiers. For example, the communication components 1064 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI signal triangulation, location via detecting a BLUETOOTH or NFC beacon signal that may indicate a particular location, and so forth.

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI.RTM. network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or other type of cellular or wireless coupling. In this example, the coupling 1082 can implement any of a variety of types of data transfer technology, such as Single Carrier Radio Transmission Technology, Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, 5G, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 can be transmitted or received over the network 1080 using a transmission medium via a network interface device (e.g., a network interface component included in the communication components 1064) and utilizing any one of a number of transfer protocols (e.g., HTTP). Similarly, the instructions 1016 can be transmitted or received using a transmission medium via the coupling 1072 (e.g., a peer-to-peer coupling) to devices 1070. The term "transmission medium" shall be taken to include any intangible medium that is capable of storing, encoding, or carrying the instructions 1016 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the innovative subject matter has been described with reference to specific example embodiments, various modifications and changes may be made to these embodiments without departing from the broader scope of embodiments of the present disclosure. Such embodiments of the novel subject matter may be referred to herein, individually or collectively, by the term "innovation" merely for convenience and without intending to voluntarily limit the scope of this application to any single disclosure or novel or innovative concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not Systems and Methods for Differential Pressure Determination and Control be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. A system to determine an air pressure difference between a first physical location and a second physical location to control air pressure in an indoor environment, the system, comprising:
    a transmitter unit installed in the indoor environment,
    the transmitter unit being operable to determine a first set of air pressure values associated with the first physical location in the indoor environment and to generate a synchronization vector;
    a receiver unit coupled to the transmitter unit;
    the receiver unit having stored thereon a second set of air pressure values associated with the second physical location;
    wherein, the first set of air pressure values associated with the first physical location in the indoor environment are to be transmitted to the receiver unit with the synchronization vector.

2. The system of claim 1, wherein:
    the transmitter unit determines the first set of air pressure values through obtaining continuous pressure measurements;
    further wherein, the transmitter unit comprises a pressure sensor to obtain the continuous pressure measurements.

3. The system of claim 2, wherein:
    the pressure sensor senses absolute pressure.

4. The system of claim 1, further comprising:
    a resistive heater unit for temperature control.

5. The system of claim 1, wherein:
    the first set of air pressure values are transmitted wirelessly.

6. The system of claim 1, wherein: in operation, the receiver unit uses the synchronization vector to align the first set of air pressure values with the second set of air pressure values by best fit correlation.

7. The system of claim 1, wherein:
    in operation, the receiver unit determines the air pressure difference between the first physical location and the second physical location using the first set of air pressure values, the synchronization vector, and the second set of air pressure values.

8. The system of claim 7,
    wherein, the receiver unit is coupled to external equipment is,
    wherein, the air pressure difference is used by the receiver unit to drive external equipment to maintain air pressure in the indoor environment at a set pressure value.

9. The system of claim 1, wherein:
    the transmitter unit is battery powered or line voltage operated;
    further wherein, the transmitter unit comprises a transmitter antenna internal to the transmitter unit;
    the receiver unit is battery powered or line voltage operated;
    further wherein, the receiver unit comprises a receiver antenna coupled to the receiver unit;
    wherein, the receiver antenna is to be mounted to external equipment being controlled by the system.

10. The system of claim 1, further comprising:
another transmitter unit installed in the indoor environment, the other transmitter being coupled to the receiver unit;
wherein, the other transmitter unit obtains another set of air pressure values to be transmitted to the receiver unit.

11. The system of claim 1, wherein:
the transmitter unit is accessible via a web browser for configuration or testing purposes;
the receiver unit is accessible via a web browser for configuration or testing purposes.

12. A system to determine differential pressure to control external equipment to maintain indoor air pressure in a building at a set pressure point, the system, comprising:
a receiver device integrated with external equipment to adjust the indoor air pressure in the building;
a processor coupled to the receiver device;
memory coupled to the processor, the memory having stored thereon instructions, which when executed by the processor, cause the processor to:
capture, continuously, a first set of air pressure measurements from the receiver device;
compare the first set of air pressure measurements with a second set of air pressure measurements to determine the differential pressure between the indoor air pressure in the building and outside air pressure outside of the building;
control the external equipment to maintain the indoor air pressure in the building at the set pressure point based on the differential pressure.

13. The system of claim 12, wherein:
the second set of air pressure measurements are received from one or more transmitter devices installed in the building.

14. The system of claim 13, wherein:
the second set of air pressure measurements is included in data received from at least one of the one or more transmitter devices;
further wherein, the data further includes a synchronization vector;
wherein, the synchronization vector is generated using time elapsed between a time of measurement of one of the external set of air pressure measurements and a time of transmission of packet.

15. The system of claim 12, wherein:
the synchronization vector is generated using time elapsed between a time of measurement of one of the external set of air pressure measurements and a time of transmission of packet.

16. The system of claim 12, wherein:
one or more of pre-processing and post-processing is performed on the data to improve signal quality.

17. The system of claim 16, wherein:
the signal quality is improved by correcting for a temperature factor.

18. The system of claim 16, wherein:
the signal quality is improved by correcting for a noise factor.

19. The system of claim 16, wherein:
the signal quality is improved by correcting for a drift factor.

20. The system of claim 16, wherein:
the signal quality is improved by correcting for RF interference.

21. The system of claim 16, wherein:
the signal quality is improved by adapting to an ambient air pressure difference.

22. The system of claim 16, wherein:
one or more of pre-processing and post-processing is performed on the data to improve signal quality;
the signal quality is improved by correcting for altitude differences between the sensor and the one or more transmitter devices.

23. The system of claim 12, wherein:
security processing is performed for one or more of privacy and authentication.

24. The system of claim 12, further comprising:
a temperature controller coupled to the sensor to control the temperature of the receiver device;
wherein, the receiver device, includes a pressure sensor.

25. The system of claim 24, wherein:
temperature of a membrane of the receiver device; is controlled.

26. The system of claim 24, wherein:
temperature of a membrane of the receiver device, is controlled where there is a difference in volume across the member.

27. A method to use air pressure measurements associated with multiple transmitter devices to control external equipment to maintain a se pressure point in an indoor environment, the method, comprising:
determining a first pressure difference between a first pressure value and a receiver pressure value, the first pressure value to be measured by a first transmitter device and the receiver pressure value to be measured by a receiver device;
wherein, the first transmitter device is located in the indoor environment;
determining a second pressure difference between a second pressure value and a second receiver pressure value, the second pressure value to be measured by a second transmitter device and the second receiver pressure value to be measured by the receiver device;
wherein, the second transmitter device is located in the indoor environment;
determining an error value using the first pressure difference, the second pressure difference and the target pressure value;
generating an output value from the error value;
controlling the external equipment using the output value to maintain the set pressure point in the indoor environment at the target pressure value.

28. The method of claim 27,
further comprising:
determining a proportional error value using the error value and a first coefficient;
determining an integral error value using the error value and a second coefficient.

29. The method of claim 28, wherein:
the integral error value is determined using the second coefficient and an average of the error value determined over a period of time.

30. The method of claim 27, further comprising:
determining a first differential value by applying a first weight to the first pressure difference;
wherein, the first weight is determined from the error value;
determining a second differential value by applying a second weight to the second pressure difference;
wherein, the second weight is determined from the error value;
updating the error value using the first differential value, the second differential value, and the target pressure value.

31. The method of claim 27, further comprising:
determining a proportional error value using the error value and a first coefficient;
determining an integral error value using the error value and a second coefficient;
determining a weighted error term using the proportional error value and the integral error value.

32. The method of claim 27, further comprising:
determining a proportional error value using the error value and a first coefficient;
determining an integral error value using the error value and a second coefficient;
determining a weighted error term using the proportional error value and the integral error value;
wherein, the output value used in controlling the external equipment the output value is used to drive the single output to control the external equipment is determined from the weighted error term-.

33. The method of claim 27, wherein:
pressure differences are determined from additional transmitter devices installed in the indoor environment for use in generating the output value.

\* \* \* \* \*